United States Patent [19]
Taniguchi

[11] Patent Number: 5,917,653
[45] Date of Patent: Jun. 29, 1999

[54] BINOCULARS CAPABLE OF VIBRATION REDUCTION

[75] Inventor: Akira Taniguchi, Yokohama, Japan

[73] Assignee: Nikon Corporation, Tokyo, Japan

[21] Appl. No.: 08/867,442

[22] Filed: Jun. 2, 1997

[30] Foreign Application Priority Data

Jul. 3, 1996 [JP] Japan .................................. 8-173612

[51] Int. Cl.⁶ .............................................. G02B 27/64
[52] U.S. Cl. ........................................ 359/557; 359/554
[58] Field of Search .................................. 359/407, 409, 359/554–557, 696–700, 813, 814, 823, 824, 480–482; 396/52–55, 79, 421; 348/208

[56] References Cited

U.S. PATENT DOCUMENTS

| | | | |
|---|---|---|---|
| 765,607 | 7/1904 | Aitchison | 359/407 |
| 5,398,132 | 3/1995 | Otani | 359/557 |
| 5,500,769 | 3/1996 | Betensky | 359/407 |
| 5,530,505 | 6/1996 | Ohishi et al. | 396/52 |
| 5,606,456 | 2/1997 | Nagata et al. | 359/557 |

FOREIGN PATENT DOCUMENTS

| | | | |
|---|---|---|---|
| 54-23554 | 2/1979 | Japan . | |
| 6-250100 | 9/1994 | Japan | 359/554 |
| 7-43645 | 2/1995 | Japan . | |

*Primary Examiner*—Thong Nguyen
*Attorney, Agent, or Firm*—Morgan, Lewis & Bockius LLP

[57] ABSTRACT

In order to make the visibility of a right optical system to be the same as that of a left optical system even when there is a vibration and to simplify a drive mechanism, a pair of right and left correction lenses are respectively disposed between a pair of right and left objective lenses and a pair of right and left eye pieces. The pair of right and left objective lenses are integrally supported by a correction lens support frame. When there is a vibration, the correction lens support frame is moved, together with the pair of right and left correction lenses, by a correction lens moving mechanism in X and/or Y directions which cross each other at right angles in a plane perpendicular to the optical axis of each of the optical systems.

6 Claims, 8 Drawing Sheets

EYE PIECE SIDE

OBJECTIVE LENS SIDE

OBJECTIVE LENS SIDE

EYE PIECE SIDE

OBJECTIVE LENS SIDE

EYE PIECE SIDE

OBJECTIVE LENS SIDE

EYE PIECE SIDE

BINOCULARS CAPABLE OF VIBRATION REDUCTION

This application claims the benefit of Japanese Application No. 8-173612 which is hereby incorporated by reference.

BACKGROUND OF THE INVENTION

1. Field of the Invention

The present invention relates to a pair of binoculars with a vibration reduction mechanism by which an object to be observed can be seen as being substantially at a standstill, even when a hand of the observer is shaking.

2. Related Background Art

Conventional binoculars with a vibration reduction mechanism are disclosed, for example, in Japanese Patent Laid-Open Application No. 54-23554 and No. 7-43645.

A binoculars disclosed in the former application are provided with a pair of right and left objective lenses, a pair of right and left eye pieces, a pair of right and left erect prisms arranged between the pair of right and left objective lenses and the pair of right and left eye pieces, a single prism support frame for supporting this pair of right and left erect prisms, a gimbal support device for supporting the prism support frame as being rotatable around two axes which cross each other at right angles on a plane perpendicular to the optical axis, and a gyroscopic motor which is attached to a lens support frame.

A binoculars disclosed in the latter application is provided with a pair of right and left objective lenses, a pair of right and left eye pieces, a pair of right and left variable vertical angle prisms which are arranged between the pair of right and left objective lenses and the pair of right and left eye pieces, a sensor for detecting a vibration of the main body, a plurality of actuators for driving the pair of right and left variable vertical angle prisms, and a control circuit for determining an amount of drive of each of the actuators based on the vibration detected by the sensor.

The prior technology disclosed in the above-mentioned Japanese Patent Laid-Open Application No. 54-23554 is superior in that the pair of right and left erect prisms are supported by the single prism support frame and driven by the single gyroscopic motor so that the drive mechanism can be simplified. However, according to this prior technology, if, for example, the prism support frame is rotated around the axis in the vertical direction located midway between the right and left erect prisms due to a horizontal vibration so that the erect prism of the left optical system is moved to the object lens side and the erect prism of the right optical system to the eye piece side, a distance between the objective lens and the erect prism of the left optical system becomes different from a distance between the objective lens and the erect prism of the right optical system, so that a visibility of the right optical system becomes different from that of the left optical system. In other words, according to the prior technology, there arises a problem in that the mutual positional relationship among the plurality of optical components which constitute the right optical system turns out not to be identical with the mutual positional relationship among the plurality of optical components which constitute the left optical system for a vibration in the horizontal direction, and the visibility of the right optical system becomes different from that of the left optical system. Further, according to this prior technology, in order to reduce a swinging diameter of the erect prism so as to reduce the difference between the visibility of right and left optical systems and also to reduce the size of the binoculars, it is required to arrange the right and left erect prisms substantially midway between the right and left objective lenses and the right and left eye pieces. Accordingly, an erect prism of a comparatively large size is required and, as a result, there also arises a problem in that the size of the pair of binoculars is increased and the degree of freedom in designing the optical systems is limited.

On the other hand, according to the prior technology disclosed in the latter Japanese Patent Laid-Open Application No. 7-43645, the right and left variable vertical angle prisms are driven independently of each other so that the problems of the former prior technology are not brought about. However, since the right and left variable vertical angle prisms are driven independently of each other, there arises a different problem in that the drive mechanism becomes complicated so as to increase the cost as well as the size thereof.

SUMMARY OF THE INVENTION

An object of the present invention is to provide a pair of binoculars with a vibration reduction mechanism in which the visibility of the right optical system is the same as that of the left optical system even when there is a vibration, the degree of freedom in designing the optical systems is not much limited, the drive mechanism is simplified, and the cost and the size thereof can be reduced.

The pair of binoculars with a vibration reduction mechanism according to the invention of the present application is characterized by comprising:

a pair of right and left correction lenses which are respectively arranged between a pair of right and left objective lenses and a pair of right and left eye pieces;

a correction lens support frame which integrally supports the pair of right and left correction lenses;

a correction lens moving mechanism which moves the correction lens support frame together with the pair of right and left correction lenses in planes each of which is perpendicular to the optical axis of each optical system in two directions independently;

vibration detection means for detecting a vibration of a casing; and control means for controlling an amount of drive of the correction lens moving mechanism in such a manner that an image vibration due to a vibration of the casing can be offset by a movement of the pair of right and left correction lenses based on the vibration detected by the vibration detection means.

Here, the above-mentioned control means may comprise:

lens moving amount detection means for detecting moving amounts of the pair of right and left correction lenses; and calculation means for calculating moving amounts of the pair of right and left correction lenses based on the vibration detected by the vibration detection means so as to obtain an amount of drive of the correction lens moving mechanism based on a difference between these moving amounts and the moving amounts detected by the lens moving amount detection means.

Also, it is preferable that the correction lens moving mechanism is arranged between the right and left correction lenses.

DESCRIPTION OF THE PREFERRED EMBODIMENT

Description will be made binoculars with a vibration reduction mechanism as an embodiment according to the present invention with reference to the drawings.

Figure 1:
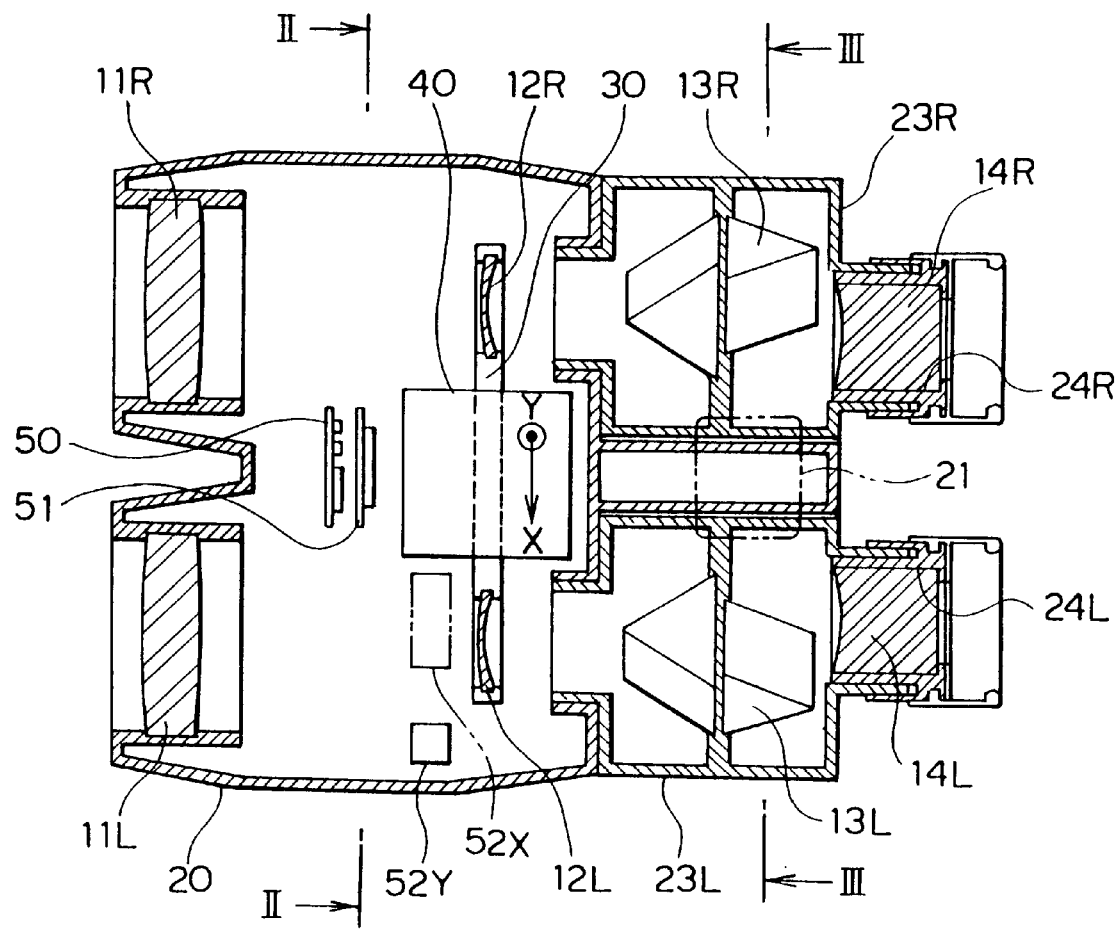
FIG. 1 is a cross-sectional view showing binoculars with a vibration reduction mechanism in a horizontal direction as an embodiment according to the present invention.

This binoculars with the vibration reduction mechanism is provided, as shown in FIG. 1, with a pair of right and left optical systems, a casing which covers these optical systems, and a vibration reduction mechanism which reduces a vibration of an image due to a vibration or the like of this casing.

Each of the right and left optical systems comprises an objective lens 11R or 11L, a correction lens 12R or 12L which focuses an image from the objective lens 11R or 11L at a target position, an eye piece 14R or 14L which is arranged substantially at the focus position of the image, and an erect prism 13R or 13L which is arranged between the correction lens 12R or 12L and the eye piece 14R or 14L.

Figure 2:
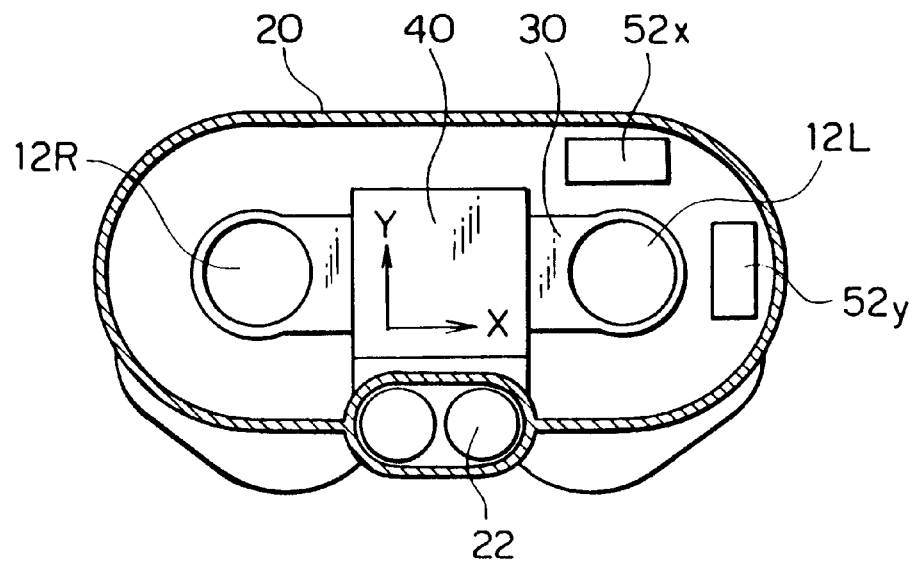
FIG. 2 is a cross-sectional view showing the binoculars, taken along the line II—II in FIG. 1.
Figure 3:
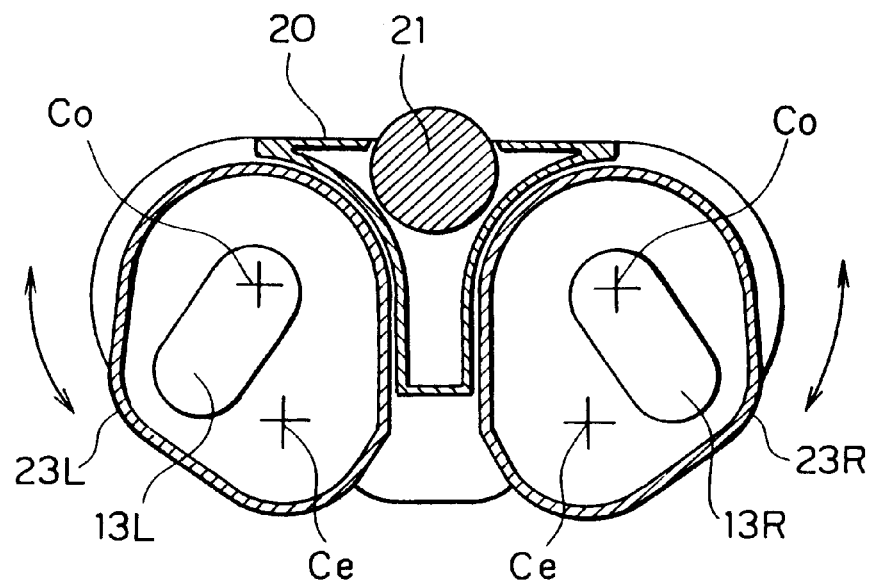
FIG. 3 is a cross-sectional view for showing the binoculars, taken along the line III—III in FIG. 1.

The casing comprises a main body casing 20 which contains the pair of right and left objective lenses 11R and 11L, the pair of right and left correction lenses 12R and 12L and the vibration reduction mechanism, a right prism box 23R which contains the erect prism 13R and the eye piece 14R of the right optical system, and a left prism box 23L which contains the erect prism 13L and the eye piece 14L of the left optical system. As shown in FIG. 3, the right prism box 23R is attached to the main body casing 20 so as to be rotatable around the optical axis Co of the right objective lens 11R. Also, the left prism box 23L is attached to the main body casing 20 so as to be rotatable around the optical axis Co of the left objective lens 11L. The optical axis Co or Co of the objective lens 11R or 11L and the optical axis Ce or Ce of the eye piece 14R or 14L are parallel to each other and are connected to each other through the erect prism 13R or 13L. As shown in FIG. 3, when the eye piece 14R or 14L is rotated together with the prism box 23R or 23L around the optical axis Co or Co of the objective lens 11R or 11L while the both optical axes Co and Ce are connected to each other by the erect prism 13R or 13L, a distance between the right and left eye pieces 14R and 14L can be adjusted in accordance with a distance between the both eye of the observer. The eye pieces 14R and 14L are respectively supported by the eye piece frames 24R and 24L. The eye piece frames 24R and 24L are respectively attached to the prism boxes 23R and 23L so as to be movable in the directions of the optical axes Ce of the eye pieces 14R and 14L. As shown in FIG. 3, a focus knob 21 is disposed above the main body casing 20 near the eye piece. When this focus knob 21 is rotated, the eye piece 14R or 14L is moved in the direction of the optical axis Ce together with the eye piece frame 24R or 24L so as to perform focal adjustment. Below the main body casing 20, there is provided a battery containing portion 22 which contains a battery for operating a vibration reduction mechanism, as shown in FIG. 2.

Figure 4:
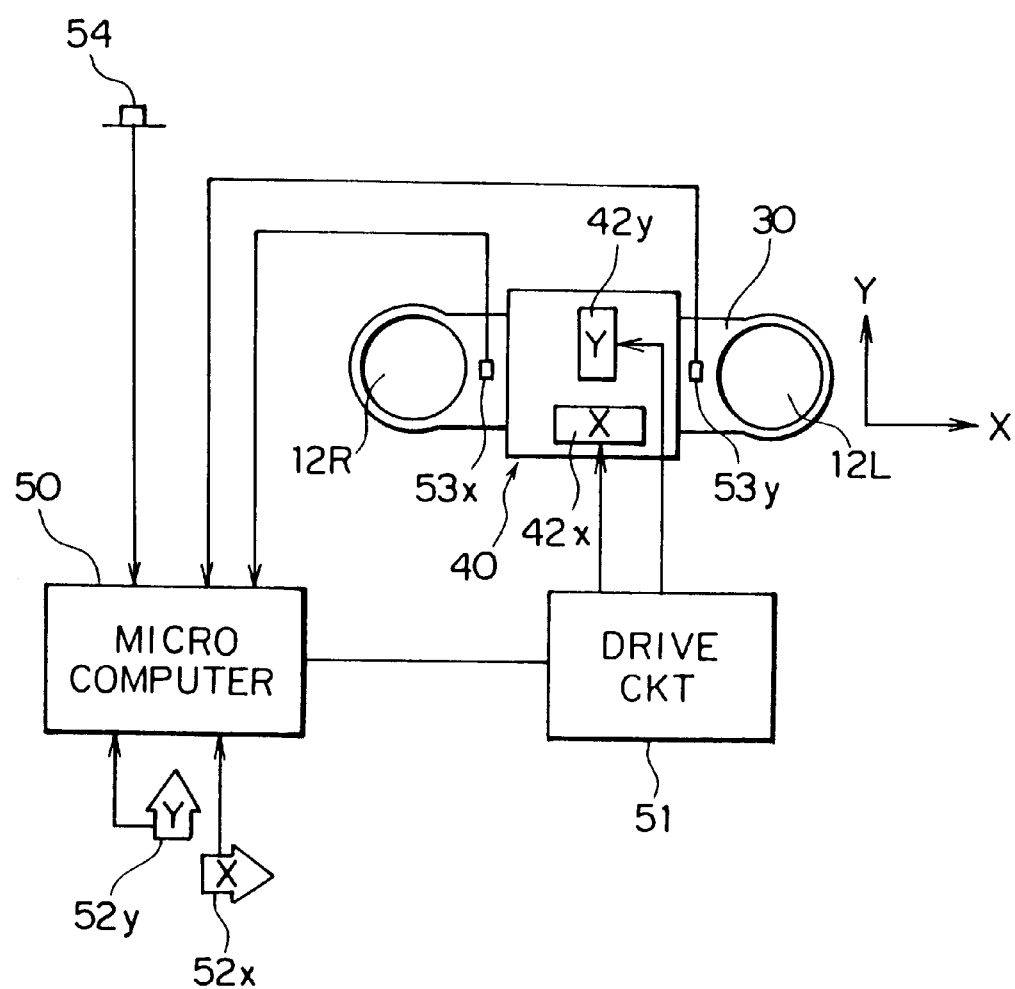
FIG. 4 is a circuit block diagram of the binoculars with the vibration reduction mechanism as the embodiment according to the present invention.

The vibration reduction mechanism comprises, as shown in FIG. 4, a correction lens support frame 30 which integrally supports the pair of right and left correction lens 12R and 12L, a correction lens moving mechanism 40 which moves this correction lens support frame 30, a vibration reduction switch 54 which is used by the user to instruct execution of a vibration reduction, a vibration sensor 52$x$ which detects a vibration of the main body casing 20 in the X direction, a vibration sensor 52$y$ which detects a vibration of the main body casing 20 in the Y direction, a micro computer 50 which obtains an amount of drive of the correction lens moving mechanism 40 in accordance with an output from the vibration sensor 52$x$ or 52$y$, a drive circuit 51 which drives and controls the correction lens moving mechanism 40 in accordance with a driving amount obtained by the micro computer 50, and correction lens moving amount sensors 53$x$ and 53$y$ which detect actual moving amounts of the correction lenses 12R and 12L in the X and Y directions, respectively.

The correction lens moving mechanism 40 is arranged between the right and left correction lenses 12R and 12L, as shown in FIGS. 5 to 12, for moving the correction lens support frame 30 on a plane perpendicular to the optical axis Co of the optical system independently in the X direction and the Y direction which are perpendicular to each other. This correction lens moving mechanism 40 comprises an X-directional driving substrate 41$x$ which supports the correction lens support frame 30 as being movable in the X direction, a Y-directional driving substrate 41$y$ which supports this X-directional driving substrate 41$x$ as being movable in the Y direction, an X-directional driving motor 42$x$ which is fixed to the X-directional driving substrate 41$x$ and serves as a driving source for moving the correction lens support frame 30 in the X direction, and a Y-directional driving motor 42$y$ which is fixed to the Y-directional driving substrate 41$y$ and serves as a driving source for moving the Y-directional driving substrate 41$y$ in the Y-direction.

Figure 5:
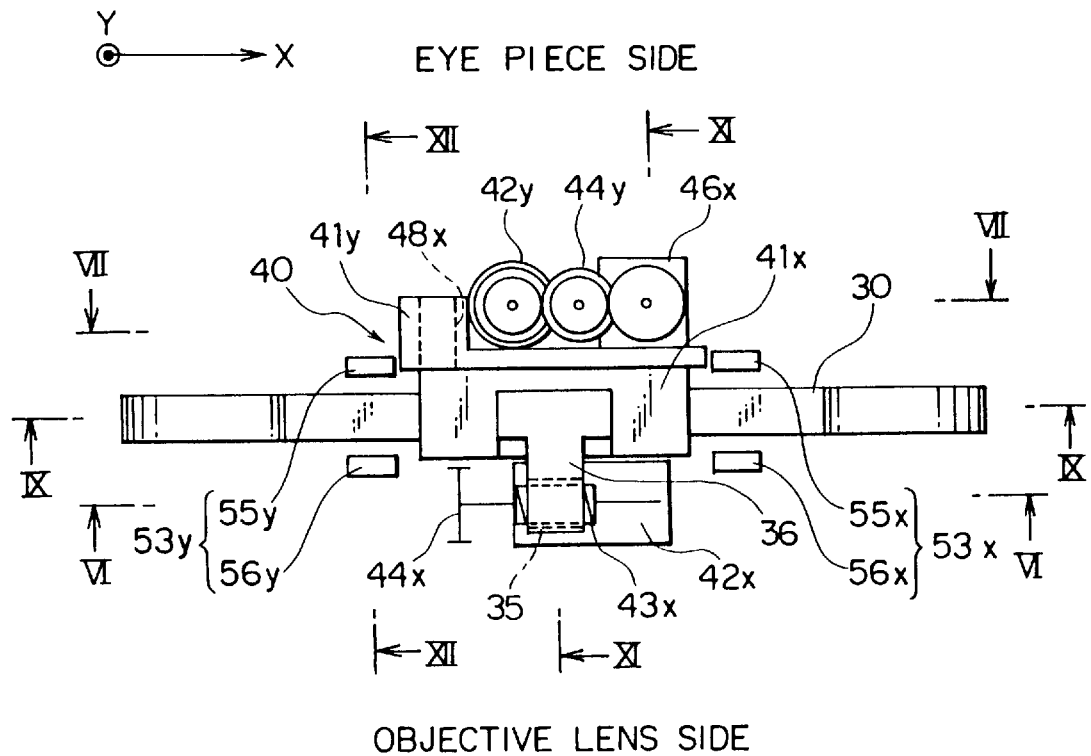
FIG. 5 is a top view showing a correction lens support frame and a correction lens moving mechanism of the binoculars with the vibration reduction mechanism as the embodiment according to the present invention.
Figure 6:
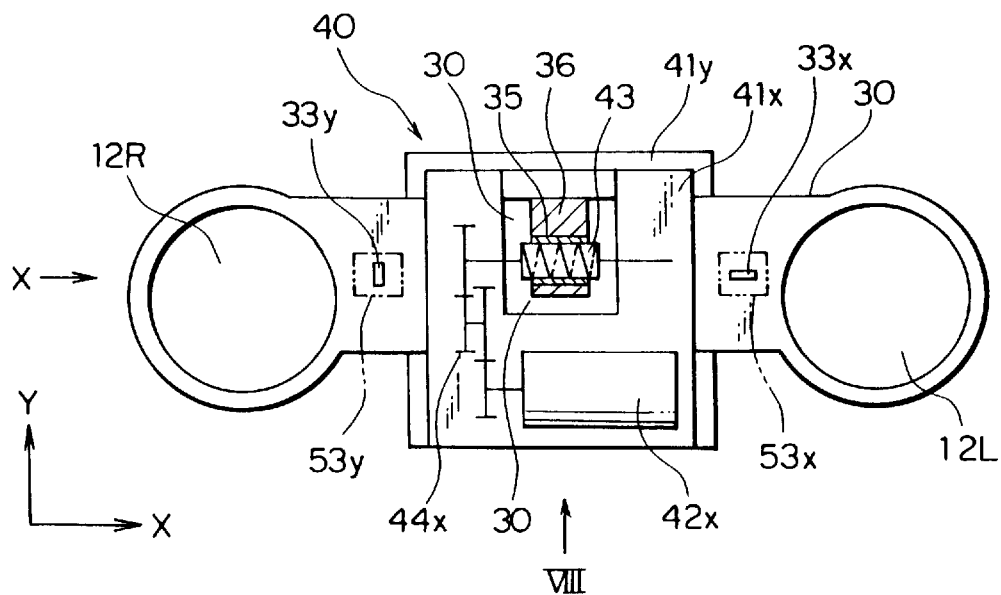
FIG. 6 is a cross-sectional view for showing the pair of binoculars, taken along the line VI—VI in FIG. 5.
Figure 8:
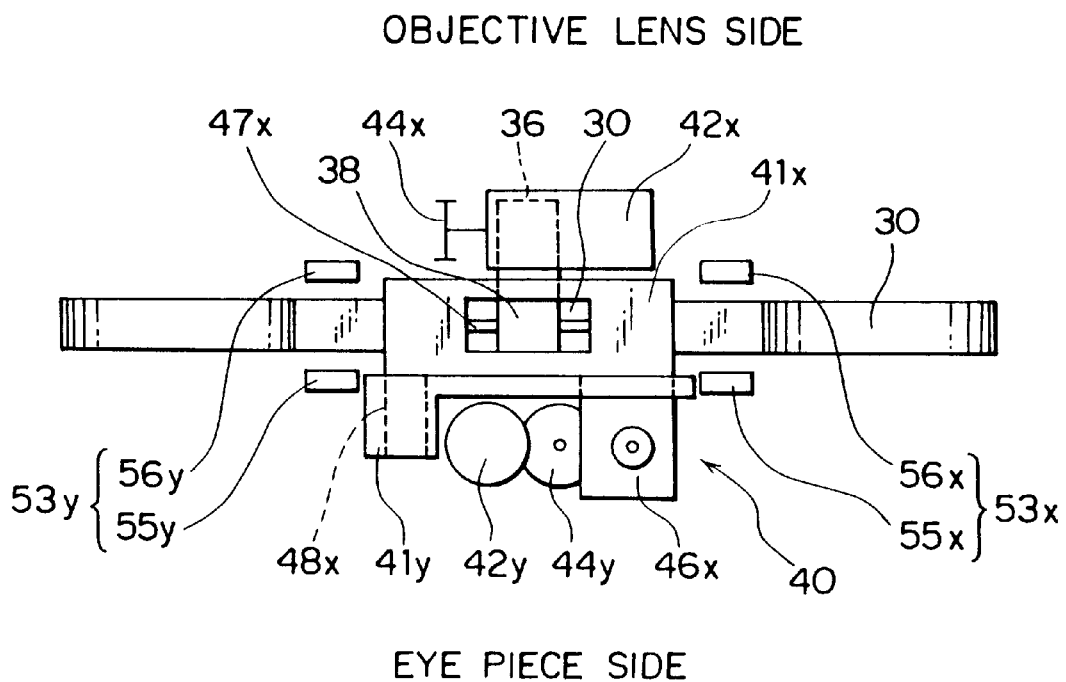
FIG. 8 is a view for showing the binoculars, taken along the arrow VIII in FIG. 6.
Figure 9:
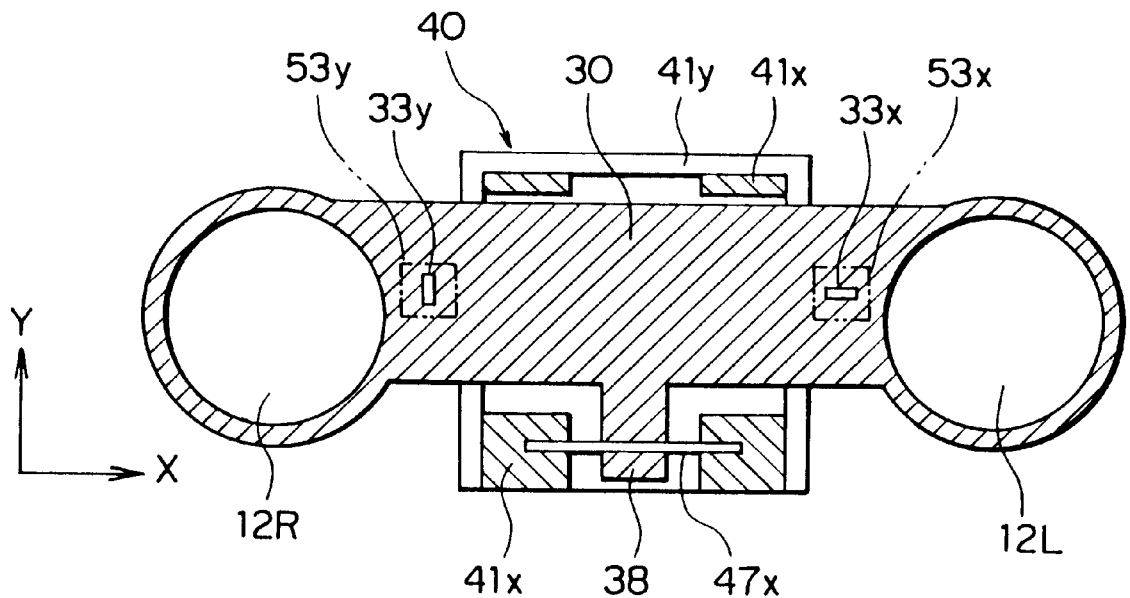
FIG. 9 is a cross-sectional view for showing the binoculars, taken along the line IX—IX in FIG. 5.
Figure 11:
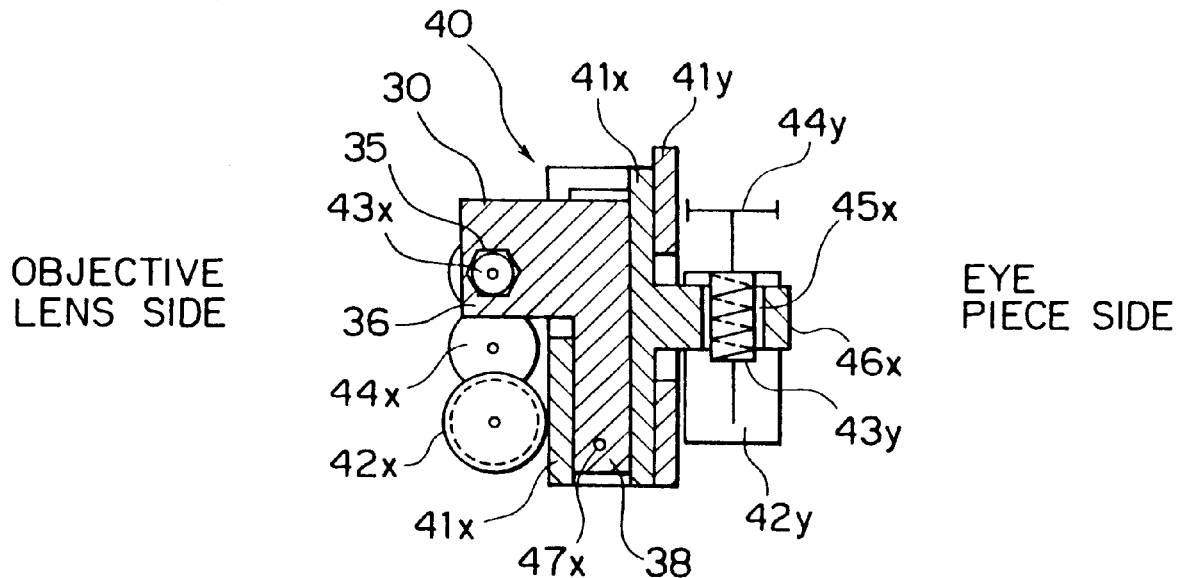
FIG. 11 is a cross-sectional view for showing the binoculars, taken along the line XI—XI in FIG. 5.

On the surface of the X-directional driving substrate 41$x$ on the objective lens side, there are provided, as shown in FIGS. 5, 6 and 11, an X-directional driving lead spring 43$x$ which extends in the X direction, and a plurality of driving force transmission gears 44$x$ for rotating this X-directional driving lead spring 43$x$ upon drive of the X-directional driving motor 42$x$. In a central portion of the correction lens support frame 30 in the X direction, a convex portion 36 is formed to be projecting on the objective lens side, and a nut member 35 with which the X-directional driving lead spring 43$x$ is threadably engaged is buried there. An X-directional guide pin 47$x$ which is extending in the X direction is fixed to the lower part of the X-directional driving substrate 41$x$, as shown in FIGS. 8, 9 and 11. An X-directional guide pin receiver 38 through which the X-directional guide pin 47x is passed, is formed in the lower part of the correction lens support frame 30. With the above-mentioned structure, when the X-directional driving motor 42x is driven and the X-directional driving lead spring 43x is rotated, the correction lens support frame 30 in which the nut member 35 is buried is moved to the X direction.

Figure 7:
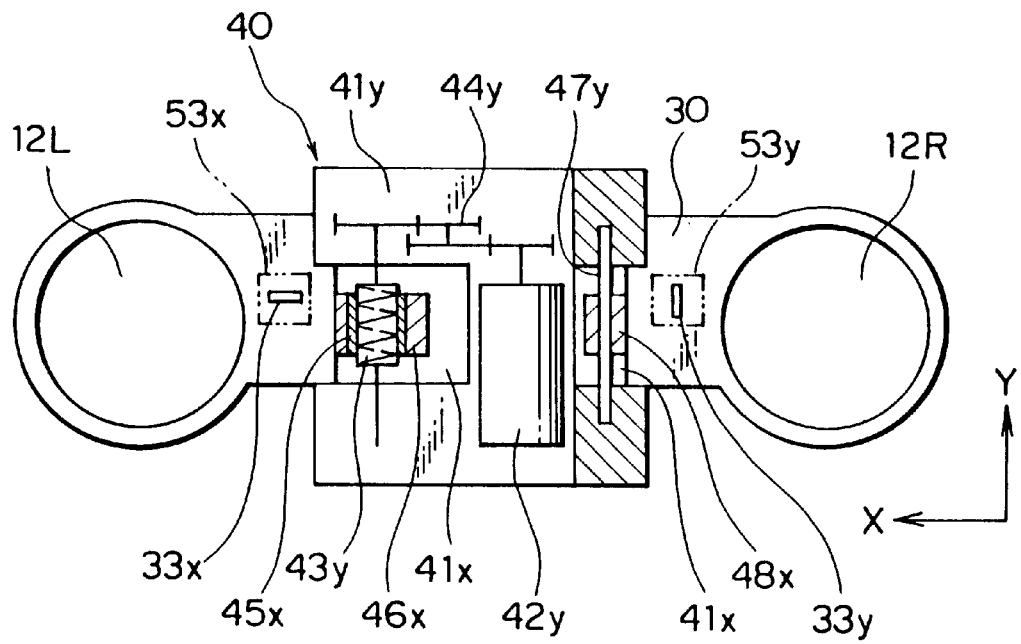
FIG. 7 is a cross-sectional view for showing the binoculars, taken along the line VII—VII in FIG. 5.
Figure 10:
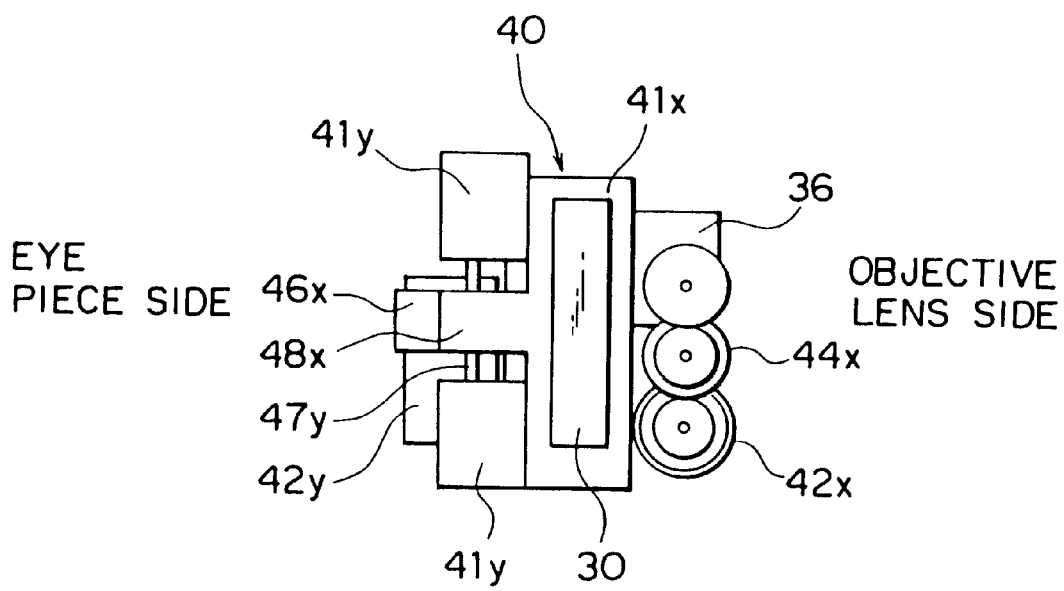
FIG. 10 is a view for showing the binoculars, taken along the arrow X in FIG. 6.

The Y-directional driving substrate 41y is fixed to the central portion of the main body casing 20. On the surface of this Y-directional driving substrate 41y on the eye piece side, there are provided a Y-directional driving lead spring 43y which is extending in the Y-direction and a plurality of driving force transmission gears 44y for rotating this Y-directional driving lead spring 43y upon drive of the Y-directional driving motor 42y, as shown in FIGS. 7 and 11. On a side portion of the X-directional driving substrate 41x, a convex portion 46x is formed to be projecting on the eye piece side, and a nut member 45x with which the Y-directional driving lead spring 43y is threadably engaged is buried there. A Y-directional guide pin 47y which is extending in the Y-direction is fixed to the side part of the Y-directional driving substrate 41y, as shown in FIGS. 7 and 10. A Y-directional guide pin receiver 48x through which the Y-directional guide pin 47y is passed, is formed on the side part of the X-directional driving substrate 41x. With the above-mentioned structure, when the Y-directional driving motor 42y is driven and the Y-directional driving lead spring 43y is rotated, the X-directional driving substrate 41x in which the nut member 45x is buried and the correction lens support frame 30 are moved in the Y direction.

Figure 12:
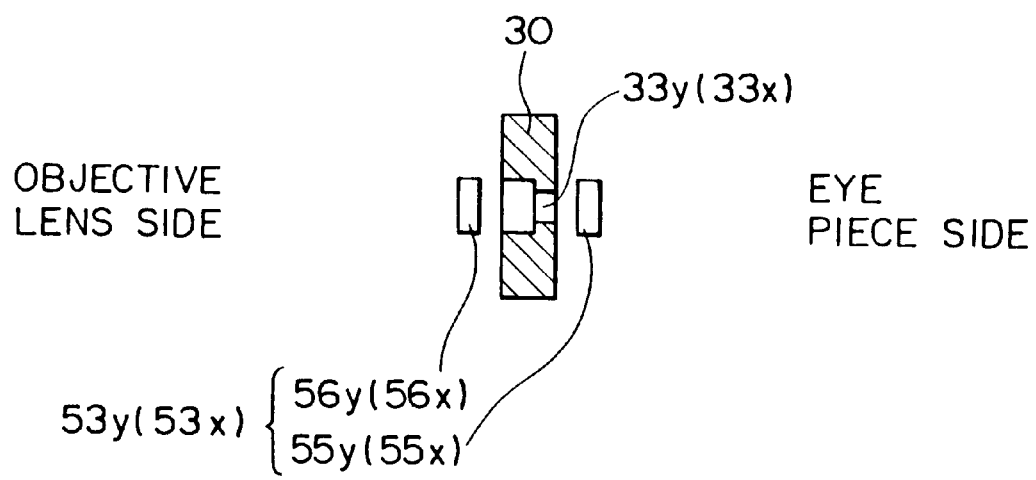
FIG. 12 is a cross-sectional view for showing the binoculars, taken along the line XII—XII in FIG. 5.

At the correction lens moving amount sensors 53x and 53y, there are provided a correction lens X-directional moving amount sensor 53x for detecting moving amounts of the correction lenses 12R and 12L in the X direction and a correction lens Y-directional moving amount sensor 53y for detecting moving amounts of the correction lenses 12R and 12L in the Y direction. The sensors 53x and 53y comprise moving amount detecting LEDs 56x and 56y and PSDs (Position Sensing Devices) 55x and 55y for detecting a moving amount. Slits 33x and 33y which are through from the objective lens side and the eye piece side are formed on the both sides of the correction lens support frame 30 in the X direction, having the correction lens moving mechanism 40 therebetween, as shown in FIGS. 6 and 12. The moving amount detecting LEDs 56x and 56y are disposed on the objective lens side respectively, having the slits 33x and 33y therebetween, and the position sensing devices PSDs 55x and 55y are disposed on the eye piece side. Light emitted from the moving amount detecting LEDs 56x and 56y is reduced by the slits 33x and 33y of the correction lens support frame 30 owing to a relative movement of the correction lens support frame 30 with respect to the sensors 53x and 53y by an amount corresponding to an amount of this relative movement. The position sensing devices PSDs 55x and 55y receive the light reduced by the slits 33x and 33y, respectively, and supply outputs corresponding to the amounts of the light to the micro computer 50. The micro computer 50 recognizes a moving amount of the correction lens support frame 30 based on the outputs from the position sensing devices 55x and 55y. Note that the PSDs and LEDs may be disposed in a reverse manner to the present embodiment. That is, the PSDs may be disposed on the objective lens side and the LEDs on the eye piece side. Moreover, though two one-dimensional moving amount sensors 53x and 53y are used in this embodiment for the X direction and the Y direction, respectively, only one two-dimensional moving amount sensor may be used to measure moving amounts in the X direction and the Y direction.

The vibration sensors 52x and 52y, the micro computer 50, and the drive circuit 51 are fixed to the main body casing 20, as shown in FIG. 1. As the vibration sensors 52x and 52y, there are provided an X-directional vibration sensor 52x for detecting a vibration in the X direction and a Y-directional vibration sensor 52y for detecting a vibration in the Y direction. Each of these vibration sensors 52x and 52y in this embodiment is an angular acceleration sensor using a vibration gyroscope. However, a velocity sensor, an angle sensor, or a displacement sensor may be used, instead. Also, though two sensors, i.e., the X-directional vibration sensor 52x and the Y-directional vibration sensor 52y, are used as the vibration sensors in this embodiment, a two-dimensional vibration sensor which is capable of sensing vibrations in two directions independently may be used, instead.

Figure 13A:
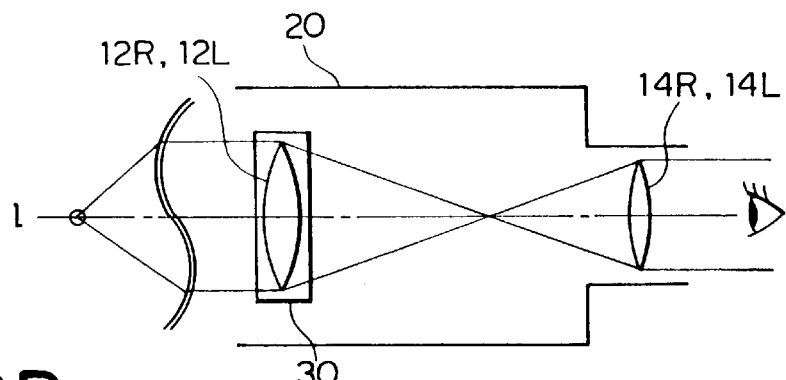
FIGS. 13A to 13C are explanatory views for explaining a vibration reduction principle of the present invention.
Figure 13B:
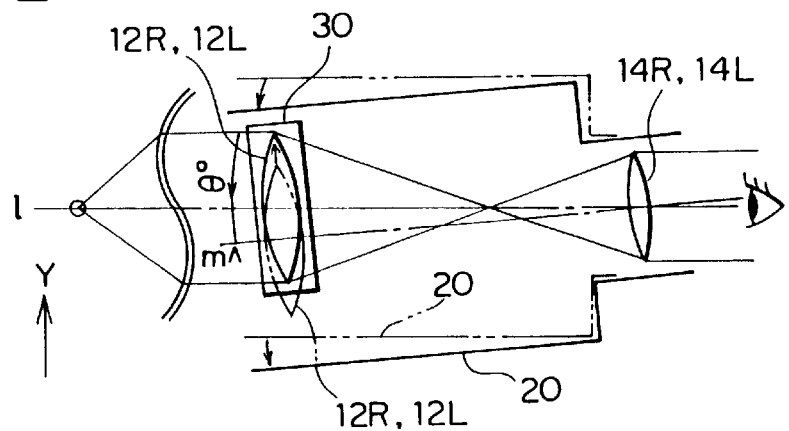

Next, description will be made on the principle of vibration reduction for the binoculars with the vibration reduction mechanism according to the present embodiment, with reference to FIGS. 13A to 13C. Note that in these drawings the objective lenses 11R and 11L and the erect prisms 13R and 13L out of the optical components for constituting the optical systems are omitted, in order to make the reduction principle easier to understand. FIGS. 13A and 13B are views showing a binoculars seen from the side, while FIG. 13C is a view showing the binoculars seen from above.

In a state shown in FIG. 13A, the correction lens support frame 30 is located at the reference position, and light from a certain object is passed through the centers of the correction lenses 12R and 12L to reach the centers of the eye pieces 14R and 14L. Here, it is assumed that the objective lens side of the main body casing 20 vibrates downward only an angle θ due to a vibration of a hand of the observer, as shown in FIG. 13B. In this case, if the correction lens were fixed, an image shift or image vibration would be brought about. Then, when the correction lenses 12R and 12L are moved in the Y direction in such a manner that the light from the object should pass through the centers of the correction lenses 12R and 12R, the light from the object which has passed through the centers of the correction lenses 12R and 12L, reaches the centers of the eye pieces 14R and 14L in the same manner as in the state shown in FIG. 13A, owing to the principle that a light passing through the center of a lens advances straight. Accordingly, even when the observer shakes the casing 20 up and down, if the correction lenses 12R and 12L are moved in the Y direction in accordance with an amount of the shake of this casing 20, the object does not appear to vibrate vertically to the observer.

Figure 13C:
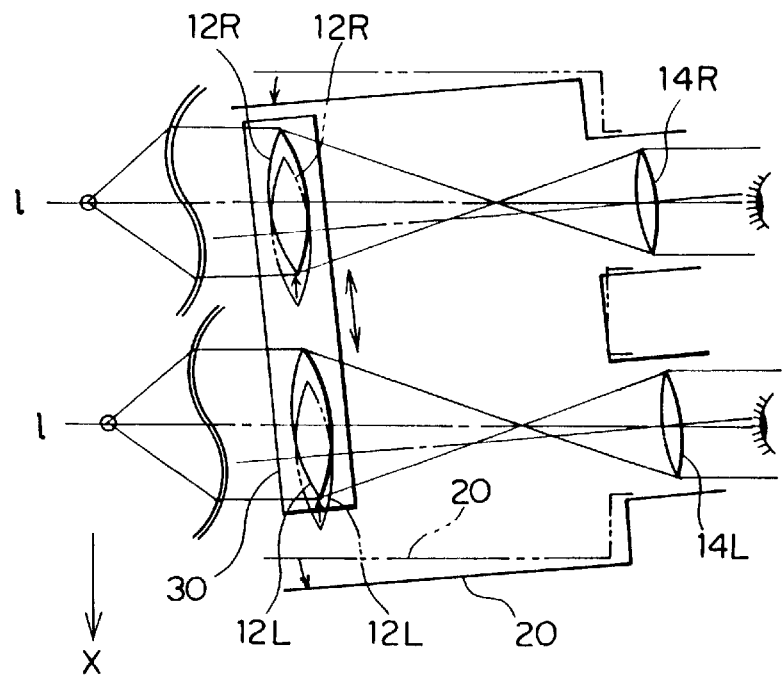

Also, when the correction lenses 12R and 12L are moved in the X direction in such a manner that light from the object should pass through the centers of the correction lenses 12R and 12L in the same manner even when the objective lens side of the casing 20 vibrates to the left only by the angle θ, as shown in FIG. 13C, from the state shown in FIG. 13A, the light from the object passing through the centers of the correction lenses 12R and 12L reaches the centers of the eye pieces 14R and 14L, in the same manner as in the prior state. Accordingly, even when the observer shakes the casing 20 right and left, if the correction lenses 12R and 12L are moved in the X direction in accordance with an amount of this shake of the casing 20, the object does not appear to vibrate horizontally to the observer.

In the present embodiment, an image vibration due to a hand vibration or the like is reduced on the basis of the reduction principle described above. More specifically, if this binoculars is used in a state where the vibration reduction switch 54 is on, a vibration of this pair of binoculars is detected by the vibration sensors 52$x$ and 52$y$. The micro computer 50 calculates moving amounts of correction lenses 12R and 12L in accordance with the vibration detected by these vibration sensors 52$x$ and 52$y$, and converts these moving amounts into an amount of drive of the correction lens moving mechanism 40, and outputs this drive amount to the drive circuit 51. The drive circuit 51 drives the correction lens moving mechanism 40 in accordance with this drive amount. Upon the driving of this correction lens moving mechanism 40, the pair of right and left correction lenses 12R and 12L are moved in the X direction and/or the Y direction, together with the correction lens support frame 30. Moving amount of the correction lenses 12R and 12L are detected by the correction lens moving amount sensors 53$x$ and 53L and supplied to the micro computer 50. The micro computer 50 calculates a difference between the correction lens moving amount detected by the sensors 53$x$ and 53$y$ and a correction lens moving amount which is previously calculated by an arithmetic operation so as to obtain a drive amount to reduce this difference. Thus, the micro computer 50 supplies this drive amount to the drive circuit 51. As a result, the correction lenses 12R and 12L are accurately moved to positions where they can offset the vibration of the casing 20. That is, in the present embodiment, a feed-back control is adopted with respect to a control on movement of the correction lenses 12R and 12L.

As described above, in this embodiment, if the casing 20 vibrates, a standstill image can be seen by offsetting a vibration of the image by moving the correction lenses 12R and 12L.

Also, in this embodiment, since the pair of right and left correction lenses 12R and 12L are supported by the single correction lens support frame 30 and a vibration is reduced by moving this correction lens support frame 30, the drive mechanism can be simplified and the manufacturing cost and the size thereof can be reduced, compared with a conventional structure in which parts of the right and left optical systems are driven independently of each other. Further, unlike the prior technology which is disclosed in Japanese Patent Laid-Open Application No. 54-23554, there is no limitation such that an erect prism should be arranged at a midway position between an objective lens and an eye piece. As a result, the degree of freedom in setting optical systems is not limited.

Since the pair of right and left correction lenses 12R and 12L are moved within a plane which is perpendicular to the optical axes Co of the objective lenses 11R and 11L, it is possible to maintain the mutual positional relationship among the plurality of optical components, which constitute the right optical system, identical with the mutual positional relationship among the plurality of optical components which constitute the left optical system. With this structure, even when there is a vibration, an image by the right optical system can appear the same as that by the left optical system.

In the correction lens moving mechanism 40 in the foregoing embodiment, the correction lens support frame 30 is moved in a predetermined direction by use of the lead springs 43$x$ and 43$y$, the nut members 35 and 45$x$ which are threadably engaged with these lead springs, the motors 42$x$ and 42$y$ for rotating the lead springs 43$x$ and 43$y$, and the like. However, the present invention is not limited to this, but is applicable to any mechanism so long that the correction lens support frame 30 can be two-dimensionally moved on a plane which is perpendicular to the optical axes Co of the object lenses 11R and 11L in the structure. For example, the correction lens support frame 30 may be moved directly in a predetermined direction by use of a linear motor.

According to the present invention, a pair of right and left correction lenses are supported by a single correction lens support frame, and a vibration of a hand or the like is reduced by moving this correction lens support frame, so that the driving mechanism can be made simpler than a conventional one in which parts of right and left optical systems are driven independently of each other, and the cost and the size of the mechanism can be reduced. Also, according to the present invention, since there is no limitation such as that optical components for reducing a vibration or the like should be disposed at predetermined positions, the degree of freedom in setting the optical systems can be maintained. Further, since the pair of right and left correction lenses are moved on a plane perpendicular to the optical axes, the mutual positional relationship among the plurality of optical components, which constitute the right optical system, can be maintained identical with the mutual positional relationship among the plurality of optical components which constitute the left optical system so that an image by the right optical system can appear the same as that by the left optical system, even when there is a vibration and the pair of right and left correction lenses are moved.

I claim:

1. A binoculars capable of vibration reduction, comprising:

a casing;

a pair of optical systems each having an objective lens and an eye piece and each being contained in the casing;

a pair of correction lenses, one of the correction lenses being disposed between the objective lens and the eye piece of one of the optical systems and the other correction lens being disposed between the objective lens and the eye piece of the other optical system;

a correction lens support frame integrally supporting the pair of correction lenses;

a drive device that moves the correction lens support frame independently in two directions in a plane perpendicular to an optical axis of each of the optical systems;

a vibration detecting device detecting vibration of the casing in each of the two directions; and a control device determining a direction and an amount of the movement of the correction lens support frame so as to reduce an image vibration based on the vibration detected by the vibration detecting device and controlling the drive device based on the determined direction and the amount of movement.

2. The binoculars according to claim 1, wherein the drive device includes a moving substrate and first and second driving members, wherein the first driving member moves the correction lens support frame in the first direction with respect to the casing, and the second driving member moves the correction lens support frame in the second direction with respect to the casing, independently of the first driving member.

3. The binoculars according to claim 1, wherein the drive device moves the correction lens support frame in a vertical direction and a horizontal direction.

4. The binoculars according to claim 1, wherein the control device further comprises a moving amount detecting device detecting actual amounts of movement of the correction lenses and adjusting the amount of movement of the correction lens support frame based on the actual amounts of movement detected by the moving amount detecting device.

5. The binoculars according to claim 4, wherein the moving amount detecting device includes LEDs disposed in the casing for supplying a detection light, slits formed in the correction lens support frame, and position sensing devices disposed in the casing for receiving the detection light via the slits so as to output an electric signal corresponding to an amount of the received detection light to the control device.

6. The binoculars according to claim 1, wherein the drive device is disposed between the pair of correction lenses.

* * * * *